United States Patent
Wang et al.

(10) Patent No.: US 12,137,488 B2
(45) Date of Patent: Nov. 5, 2024

(54) METHOD OF SETTING UP CONNECTIONS BETWEEN EDGE SITES IN A 5G COMMUNICATIONS NETWORK

(71) Applicant: Hong Kong Applied Science And Technology Research Institute Co., Ltd., Hong King (HK)

(72) Inventors: Xiao Dong Wang, Ma on Shan (HK); Zhicheng Luo, Guangdong (CN); Wai Lok Wong, Fo Tan (HK); Xue Feng, Guangdong (CN); Liang Dong, Tseung Kwan O (HK); Shijun Fan, Fanling (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 0 days.

(21) Appl. No.: 17/674,401

(22) Filed: Feb. 17, 2022

(65) Prior Publication Data
US 2023/0262791 A1    Aug. 17, 2023

(51) Int. Cl.
*H04W 76/12* (2018.01)
*H04W 28/02* (2009.01)
(52) U.S. Cl.
CPC ....... *H04W 76/12* (2018.02); *H04W 28/0268* (2013.01)
(58) Field of Classification Search
None
See application file for complete search history.

(56) References Cited

U.S. PATENT DOCUMENTS

| | | | |
|---|---|---|---|
| 10,243,860 B2 | 3/2019 | Szilagyi et al. | |
| 10,361,843 B1* | 7/2019 | Suthar | H04L 9/3257 |
| 2006/0187942 A1* | 8/2006 | Mizutani | H04L 47/803 |
| | | | 370/428 |
| 2008/0144627 A1* | 6/2008 | Ballantyne | H04L 12/4633 |
| | | | 370/392 |
| 2018/0041436 A1* | 2/2018 | Zhang | H04W 4/70 |
| 2019/0349404 A1* | 11/2019 | Jain | H04L 9/3278 |
| 2020/0021640 A1 | 1/2020 | Amento et al. | |
| 2020/0125389 A1* | 4/2020 | Palermo | G06F 9/505 |
| 2020/0145876 A1* | 5/2020 | Dao | H04W 28/06 |
| 2021/0045193 A1 | 2/2021 | Mishra et al. | |
| 2021/0117360 A1* | 4/2021 | Kutch | G06F 13/4027 |

(Continued)

FOREIGN PATENT DOCUMENTS

| | | |
|---|---|---|
| CN | 112218315 A | 1/2021 |
| CN | 112805965 A | 5/2021 |

(Continued)

OTHER PUBLICATIONS

Dunbar et al, "Dynamic Networks to Hybrid Cloud DCs Problem Statement draft-0ietf-rtgwg-net2cloud-problem-statemtn-10", Internet Draft, May 1, 2020, Publisher: Network Working Group.

*Primary Examiner* — Andre Tacdiran
(74) *Attorney, Agent, or Firm* — GableGotwals

(57) ABSTRACT

Described is a method of setting up a direct connection between edge sites on a 5G communications network. The method comprises: configuring 5G network functions (NFs) in the 5G communications network; configuring 5G NFs at the edge sites, if not already configured; and based on said configured NFs, setting up a direct tunnel between the edge sites according to a pre-defined tunnel policy.

18 Claims, 14 Drawing Sheets

(56) References Cited

U.S. PATENT DOCUMENTS

| | | | |
|---|---|---|---|
| 2021/0211392 A1* | 7/2021 | Thoppil | H04L 12/4633 |
| 2021/0250250 A1* | 8/2021 | Reznik | H04L 41/5019 |
| 2021/0274366 A1 | 9/2021 | Yao et al. | |
| 2021/0314811 A1* | 10/2021 | Barton | H04L 41/0894 |
| 2021/0409303 A1 | 12/2021 | Pande et al. | |
| 2022/0014485 A1* | 1/2022 | Pocovi | H04L 1/187 |
| 2022/0053364 A1* | 2/2022 | Kim | H04W 28/0268 |
| 2022/0103398 A1* | 3/2022 | Hu | H04L 12/4633 |
| 2022/0109717 A1* | 4/2022 | Kleinrouweler | H04L 47/225 |
| 2022/0247678 A1* | 8/2022 | Atwal | H04L 45/645 |
| 2023/0019215 A1* | 1/2023 | Wang | H04L 47/24 |
| 2023/0037031 A1* | 2/2023 | Wang | H04W 8/08 |
| 2023/0072358 A1* | 3/2023 | Baillargeon | G06F 9/5088 |
| 2023/0073863 A1* | 3/2023 | Nicoara | H04L 67/1097 |
| 2023/0134539 A1* | 5/2023 | Wang | H04L 41/16 |
| | | | 709/223 |

FOREIGN PATENT DOCUMENTS

| | | |
|---|---|---|
| CN | 113661721 A | 11/2021 |
| CN | 113938486 A | 1/2022 |
| WO | 2020072079 A1 | 4/2020 |

\* cited by examiner

METHOD OF SETTING UP CONNECTIONS BETWEEN EDGE SITES IN A 5G COMMUNICATIONS NETWORK

FIELD OF THE INVENTION

The invention relates particularly, but not exclusively, to a method of setting up connections between edge sites in a 5G communications network and, more specifically, to a method of setting up quality of service (QoS) connections between edge sites in a 5G communications network.

BACKGROUND OF THE INVENTION 5G communications network on hybrid cloud (public and private cloud) delivers ultra-responsive service experiences by rapidly processing content at the edge of the enterprise network while bringing scalability and faster time to market. However, 5G communications network architecture is complex and the configuration for 5G network functions (NFs) is therefore difficult in addition to the complex 5G communications network architecture. Enterprise users need an easy solution for hybrid 5G deployment.

For local time-sensitive applications (e.g., local live streaming services), the end-to-end Quality of Service (QoS) should be guaranteed on both the 5G network and inter-enterprise edge sites to ensure data with high priority are transmitted with reliability and low latency. The 5G network comprise the 5G core network and the 5G radio network.

US2020/0021640A1 discloses systems and methods to create and manage hybrid clouds including both standard compute nodes and edge devices. Edge devices can be enrolled in a hybrid cloud by deploying a lightweight container to the edge device.

U.S. Ser. No. 10/243,860B2 discloses methods for providing dynamic and adaptive QoS and Quality of Experience (QoE) management of U-Plane traffic while implementing user and application specific differentiation and maximizing system resource utilization by, for example, providing a system comprised of a policy server and one or more enforcement points.

CN112218315A discloses an end-to-end QoS strategy execution and Ethernet data forwarding method for a 5G private network which aims to solve the problem of high cost of a bearing mode of the existing 5G private network.

Among other things, what is therefore desired is a method for more easily establishing connections between edge sites in a 5G communication network. What is also desired is a solution for orchestrating and enforcing local end-to-end QoS policy for enterprise sites on the hybrid cloud.

OBJECTS OF THE INVENTION

An object of the invention is to mitigate or obviate to some degree one or more problems associated with known methods of establishing connections between edge sites in a 5G communications network.

The above object is met by the combination of features of the main claims; the sub-claims disclose further advantageous embodiments of the invention.

Another object of the invention is to provide a novel Orchestrator node for a 5G communications network.

A further object of the invention is to provide an improved method for setting up quality of service (QoS) connections between edge sites in a 5G communications network.

A yet further object of the invention is to provide a novel solution for orchestrating and enforcing local end-to-end QoS policy for enterprise sites on the hybrid cloud.

One skilled in the art will derive from the following description other objects of the invention. Therefore, the foregoing statements of object are not exhaustive and serve merely to illustrate some of the many objects of the present invention.

SUMMARY OF THE INVENTION

The present invention relates to preferably a one-click solution for hybrid 5G communications network deployment by setting up a direct tunnel between enterprise edge sites and providing end-to-end QoS enforcement/configuration in the 5G network and the enterprise edge network.

In a first main aspect, the invention provides a method of setting up a direct connection between edge sites on a 5G communications network. The method comprises: configuring 5G network functions (NFs) in the 5G communications network; configuring 5G NFs at the edge sites, if not already configured; and based on said configured NFs, setting up a direct tunnel between the edge sites according to a pre-defined tunnel policy.

In a second main aspect, the invention provides a method of setting up a quality of service (QoS) connection between edge sites on a 5G communications network, the method comprising the steps of: setting up a direct tunnel between the edge sites according to a pre-defined tunnel policy; configuring QoS parameters on a Policy Control Function (PCF) and an Application Function (AF) of the 5G communications network; and configuring QoS parameters in 5G network entities along an end-to-end path through the direct tunnel between the edge sites.

In a third main aspect, the invention provides an Orchestrator node for a 5G communication network connecting edge sites, the Orchestrator node comprising: a Configuration Management Module enabled to configure 5G network functions (NFs) in the 5G communications network and to configure 5G NFs at the edge sites, if not already configured; and a Tunnel Management Module configured to set up a direct tunnel over the 5G communications network between the edge sites according to a pre-defined tunnel policy based on said configured NFs.

In a fourth main aspect, the invention provides an Orchestrator node for a 5G communication network connecting edge sites, the Orchestrator node comprising a memory storing machine-readable instructions and a processor for executing said machine-readable instructions, wherein, when the machine-readable instructions are executed by the processor, they configure the processor to implement the method of the first main aspect of the invention and/or the method of the second aspect of the invention.

In a fifth main aspect, the invention provides a non-transitory computer-readable medium storing machine-readable instructions, wherein, when the machine-readable instructions are executed by a processor of a module in a communication system, they configure the processor to implement the method of the first main aspect of the invention.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
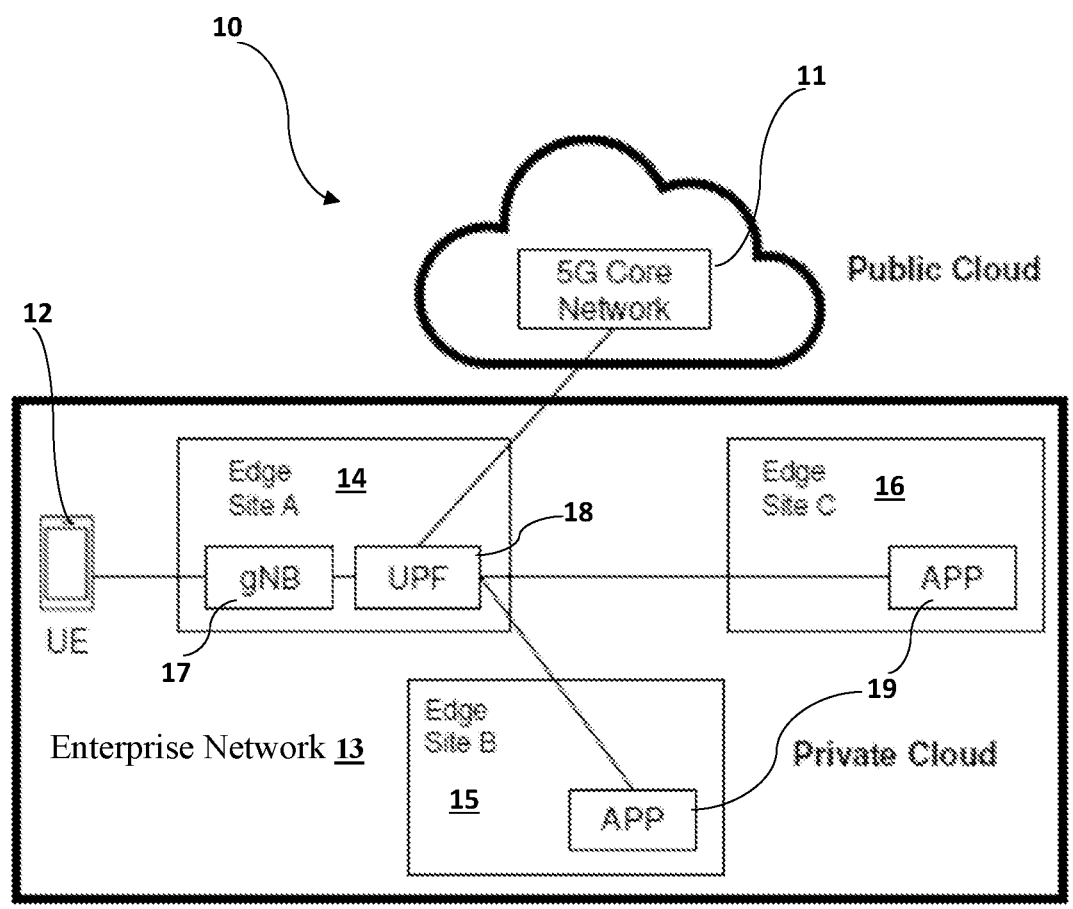
FIG. 1 is a block schematic diagram of a conventional arrangement of a 5G communications network on a hybrid cloud.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In the following description, embodiments, and methods according to the present invention will be described with respect to a 5G wireless communication network. However, it should be understood that the embodiments and methods of the invention are applicable to any suitable communications system.

Referring to the drawings, FIG. 1 provides a block schematic diagram of a conventional arrangement of a 5G communications network 10 on a hybrid cloud. A hybrid cloud, sometimes referred to as a cloud hybrid, normally comprises a computing environment that typically combines an on-premises datacenter (edge site also called a private cloud) with a public cloud, allowing data and applications to be shared between them. As shown in FIG. 1, a 5G core network 11 comprises the public cloud. A UE 12 in an enterprise network 13 connects through Edge Site A 14 to other edge sites such as Edge Site B 15 and Edge Site C 16. Edge Sites A, B, C 14, 15, 16 comprise, for example, the enterprise network 13 which can be considered as comprising the private cloud. The enterprise network 13 is a private network whose enterprise edge sites 14, 15, 16 are interconnected by the public communications network or networks comprising or provided by the 5G core network 10. In this conventional 5G communications network arrangement, the UE 12 connects through a base station (gNB or gNodeB) 17 and a User Plane Function (UPF) module 18 provided in Edge Site A 14 of the enterprise network 13 via the 5G core network 10 to either or both of Edge Site B 15 and Edge Site C 16 to access or interact with one or more applications 19 hosted in said Edge Sites B, C 15, 16. The applications 19 may comprise Multi-access Edge Computing (MEC) applications 19.

The 5G communication network has a complex architecture such that configuration of 5G network functions (NFs) is difficult to implement in the hybrid cloud. Consequently, enterprise network users require a solution to establish connections more easily between edge sites of enterprise networks in a 5G communication network, to orchestrate and to enforce local end-to-end QoS policies for enterprise edge sites on the hybrid cloud.

The present invention provides a novel solution for more easily establishing connections between, and for orchestrating and enforcing local end-to-end QoS policy for, enterprise sites on the hybrid cloud as will hereinafter be described. The novel solution of the present invention enables easy establishment of direct tunnels between edge sites and supports QoS enforcement between the UE and the MEC to provide end-to-end QoS enforcement on the enterprise network (private cloud) and QoS parameter configuration on the 5G core network (public cloud). The novel solution of the invention also supports 5G orchestration in addition to the end-to-end QoS enforcement/configuration.

Figure 2:
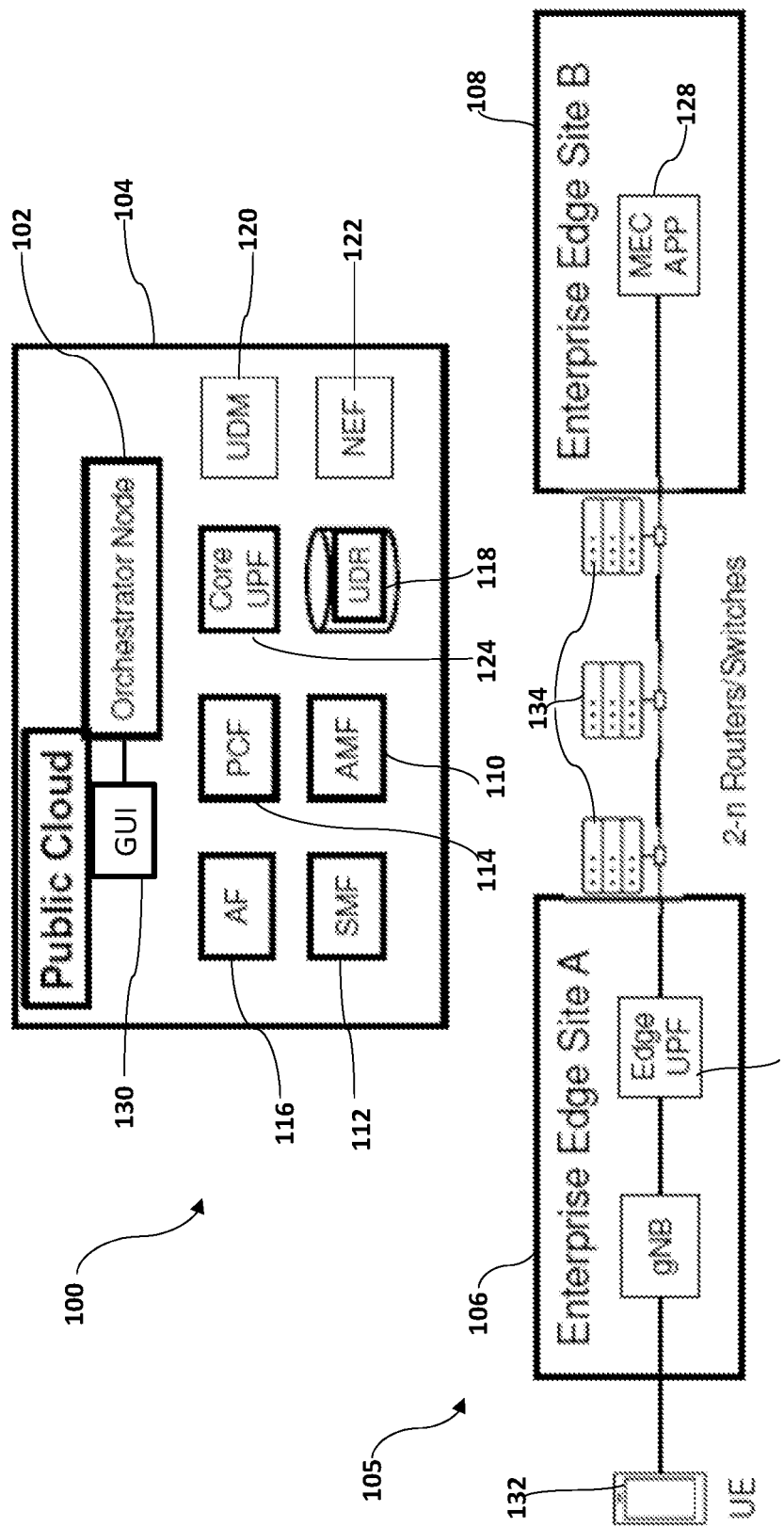
FIG. 2 is a block schematic diagram of a 5G communications network on a hybrid cloud in readiness for implementation of initial steps of the method of the invention.

Referring to FIG. 2, provided is a block schematic diagram of a 5G communications network 100 on a hybrid cloud in readiness for implementation of initial steps of the method of the invention. In a first step of the method, an Orchestrator Node 102 deploys 5G NFs in the 5G core network 104, if not already deployed, and deploys 5G NFs at the edge sites of the enterprise network 105, Edge Site A 106 and Edge Site B 108, if also not already deployed. The Orchestrator Node 102 may deploy any one or more of 5G core NFs including Access and Mobility Management Function (AMF) 110, Session Management Function (SMF) 112, Policy Control Function (PCF) 114, Application Function (AF) 116, Unified Data Repository (UDR) 118, Unified Data Management (UDM) 120, Network Exposure Function (NEF) 122 and Core User Plane Function (UPF) 124 on the public cloud 104 and edge UPF 126 and applications 128 such as MEC applications on the enterprise edge site 108, e.g., Edge Site B 108 in FIG. 2. The Orchestrator Node 102 may deploy the 5G NFs (AMF, SMF, PCF, AF, UDR and Core UPF) on the public cloud 104 and edge UPF 126 and MEC applications 128 on the enterprise Edge Sites A, B 106, 108 in a container, on a Virtual Machine (VM) or on a BareMetal server (not shown). A BareMetal server is a server used by a single consumer such as a single enterprise network.

The Orchestrator Node 102 then configures the 5G NFs in the 5G core network 104, if not already configured, and configures the 5G NFs at the edge sites 106, 108, if also not already configured. The Orchestrator Node 102 may configure the 5G NFs according to a pre-defined network design and configuration. The pre-defined network design and configuration may be input to the Orchestrator Node 102 by an enterprise network user through a graphical user interface (GUI) 130 of the Orchestrator Node 102. The pre-defined network design and configuration may be based on the deployed/configured 5G NFs.

After deployment and configuration of the 5G NFs in the public and private clouds 104, 105, a UE 132 at Edge Site A 106 is enabled to set up a Protocol Data Unit (PDU) session over the 5G core network 104 to Edge Site B 108, for example, and thereby access a local MEC application 128 at Edge Site B 108.

It will be seen in FIG. 2 that Edge Site A 106 is linked to Edge Site B 108 by a plurality of routers/switches ("2-n Routers/Switches") 134. It will be understood that the plurality of routers/switches 134 may comprise any suitable combination of routers/switches 134 for linking one enterprise edge site to another.

Figure 3:
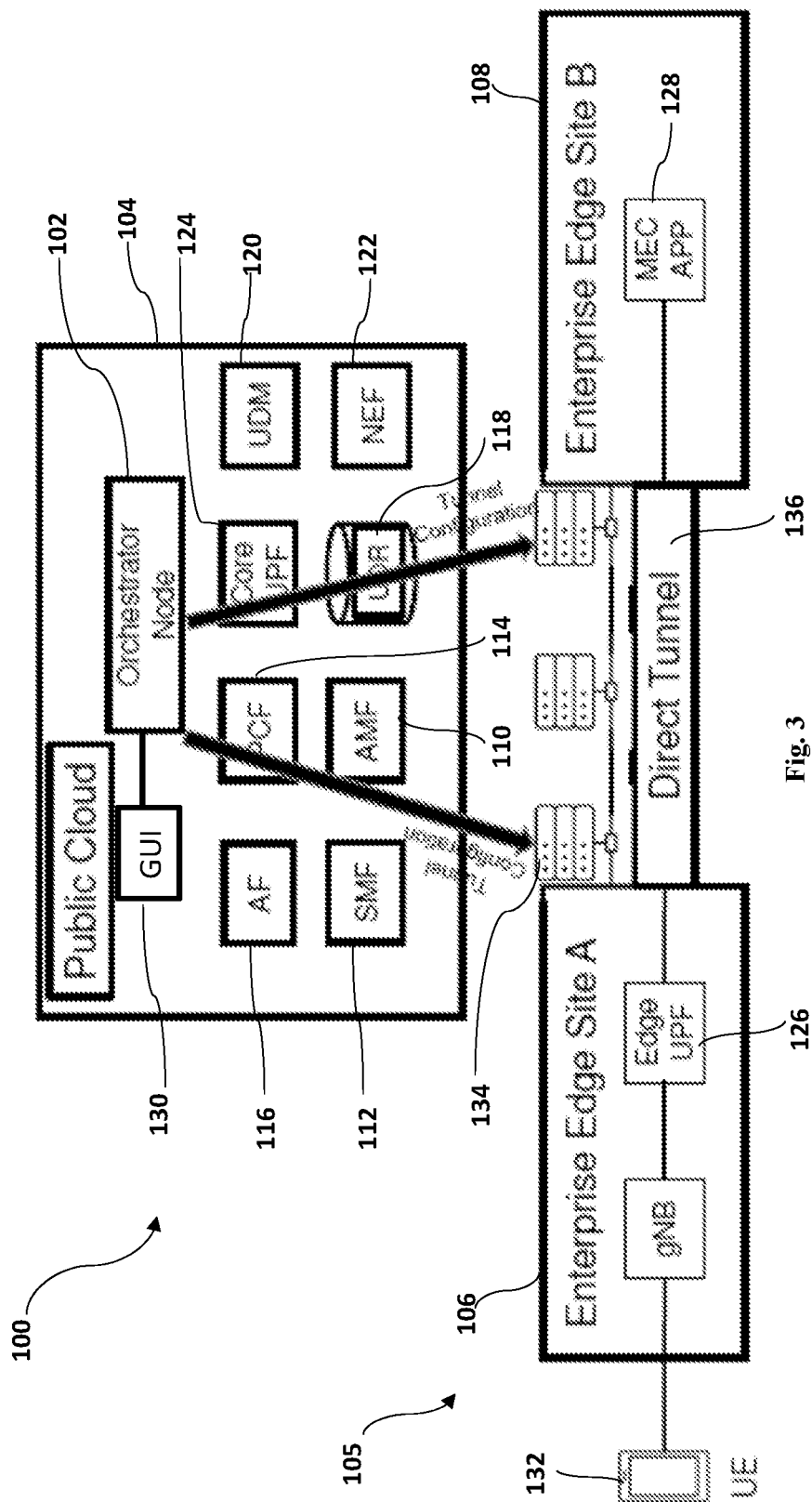
FIG. 3 a block schematic diagram of the 5G communications network on the hybrid cloud of FIG. 2 when setting up a direct tunnel between edge sites such as enterprise edge sites in accordance with the method of the invention.

Referring now to FIG. 3 which provides a block schematic diagram of the 5G communications network 100 of FIG. 2 when setting up a direct tunnel between edge sites 106, 108, one embodiment of the novel solution of the invention comprises setting up a direct tunnel 136 between Edge Site A 106 and Edge Site B 108 according to a pre-defined tunnel policy. The pre-defined tunnel policy may be input to the Orchestrator Node 102 by an enterprise network user through the GUI 130. The Orchestrator Node 102 is configured to transmit tunnel configuration data to the routers/switches 134 of the plurality of routers/switches 134 which link Edge Site A 106 to Edge Site B 108. The direct tunnel 136 is therefore set up over the plurality of routers/switches 134 and comprises a private tunnel connection for the enterprise network 105 comprising Edge Site A 106 and Edge Site B 108 in this example. The Orchestrator Node 102 may set up the direct tunnel 136 between Edge Site A 106 and Edge Site B 108 as an Internet Protocol Security (IPsec) tunnel 136.

It will be understood that, if for any reasons there is a failure of the direct tunnel 136, e.g., one or more of the plurality of routers/switches 134 fails or loses service, the Orchestrator Node 102 will dynamically determine another route to re-establish the direct tunnel 136 according to the pre-defined tunnel policy.

The Orchestrator Node 102 may be configured to store the 5G network configurations and any edge site network configurations in a database (FIG. 7) of the Orchestrator Node 102 and use the stored configurations to determine or calculate individual configurations for each 5G NF. After the Orchestrator Node 102 has pushed the determined or calculated 5G NF configurations as deployed NFs on the 5G core network 104 and as deployed NFs at the edge sites 106, 108, any UEs 132 at the edge sites 106, 108 can set up respective PDU sessions and send data traffic over one or more paths on the direct tunnel 136. The SMF 112 manages each PDU session and assigns a QoS Flow ID (QFI) and QoS profile to a data flow of each PDU session based on information provided by the PCF 114. The SMF 112 also provides the UPFs 124, 126 with a Packet Detection Rule (PDR) for mapping Service Data Flow (SDF) to the QoS flow of the PDU session.

Figure 4:
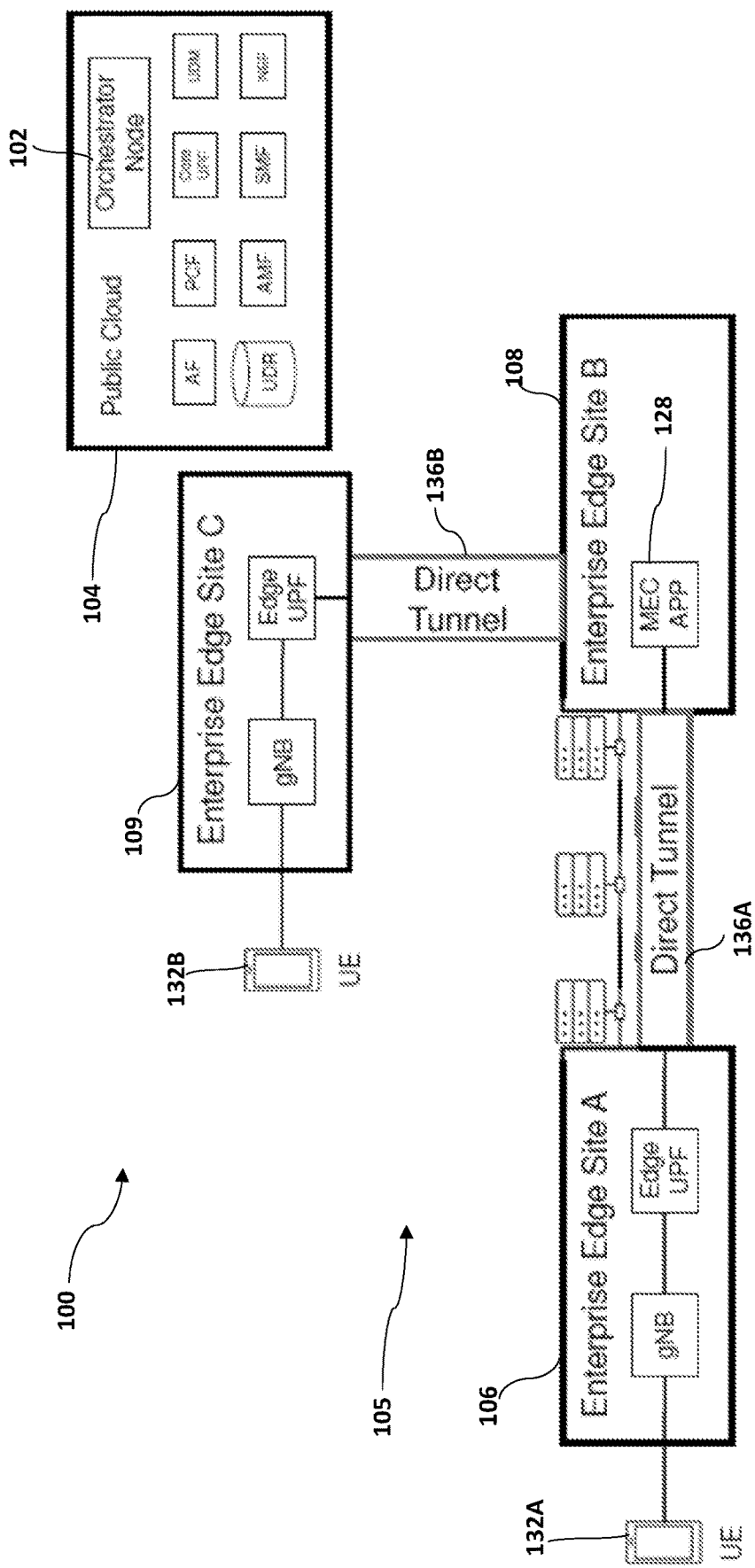
FIG. 4 is a block schematic diagram of an alternative arrangement of the 5G communications network on the hybrid cloud of FIG. 2 when setting up direct tunnels between edge sites in accordance with the method of the invention.

FIG. 4 provides a block schematic diagram of an alternative arrangement of the 5G communications network 100 on the hybrid cloud of FIG. 2 when setting up direct tunnels 136 between multiple edge sites, but like numerals are used to denote like or similar parts. In the network arrangement of FIG. 4, the enterprise network 105 comprises three edge sites, Edge Site A 106, Edge Site B 108, and Edge Site C 109. The Orchestrator Node 102 may set up a first direct tunnel 136A between Edge Site B 108 and Edge Site A 106 in the manner described with respect to FIG. 3 to provide the first UE 132A connected to Edge Site A 106 with access to the MEC application 128 hosted by Edge Site B 108. The Orchestrator Node 102 may also set up a second direct tunnel 136B in a same or similar manner between Edge Site B 108 and Edge Site C 109 which not only enables the second UE 132B connected to Edge Site C 109 to access the MEC application 128 hosted by Edge Site B 106 but also to enable the first and second UEs 132A, B to connect via the first and second direct tunnels 136A, B if a UE site-to-site policy is enabled. The Orchestrator Node 102 may set up the first and second direct tunnels as IPsec tunnels 136A, B.

Figure 5:
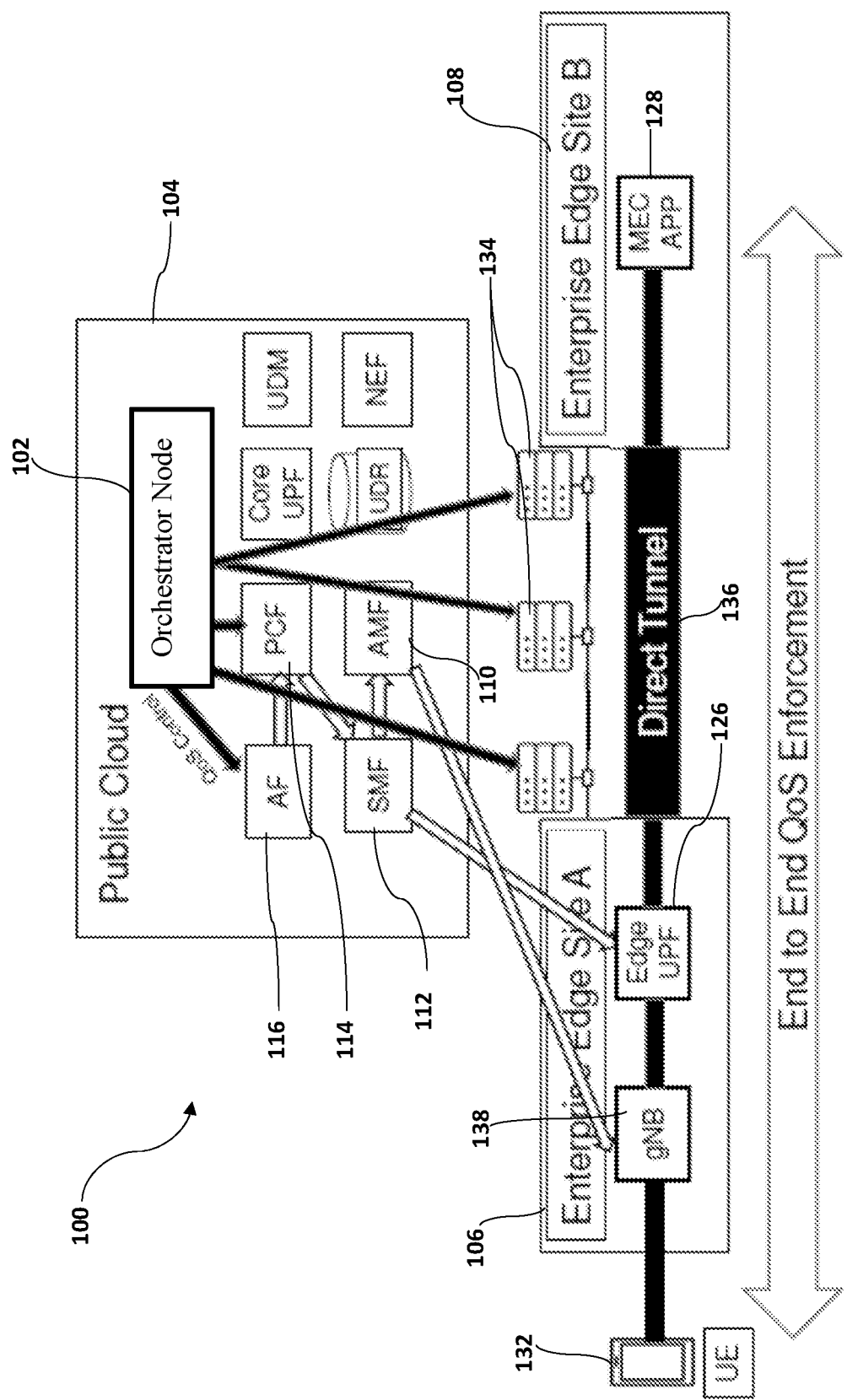
FIG. 5 a block schematic diagram of the 5G communications network on the hybrid cloud of FIG. 2 when setting up QoS policy on an end-to-end data traffic path on the direct tunnel between edge sites in accordance with the method of the invention.

FIG. 5 provides a block schematic diagram of the 5G communications network 100 of FIG. 2 when setting up QoS policy on an end-to-end data traffic path on the direct tunnel 136 between Edge Site A 106 and Edge Site B 108. To set up the QoS connection on the direct tunnel 136 between the Edge Site A 106 and Edge Site B 108, the Orchestrator Node 102 configures QoS parameters on the PCF 114 and the AF 116 and then configures QoS parameters in the 5G network entities such as the plurality of routers/switches 134 along the end-to-end path through the direct tunnel 136 between Edge Site A 106 and Edge Site B 108. It will be seen in FIG. 5 that the Orchestrator Node 102 transmits direct QoS control signals to the AF 116, the PCF 114, and the plurality of routers/switches 134 as indicated by the solid arrows in FIG. 5. In addition, the Orchestrator Node 102 transmits indirect QoS control signals to edge sites entities such as the gNB 138 and edge UPF 126 as indicated by the outlined arrows in FIG. 5. The indirect QoS signals transmitted by the Orchestrator Node 102 to the edge site entities 126, 128, 138 are transmitted via the AF 116, the PCF 114 and the SMF 112 and, in some embodiments, also via the AMF 110. The Orchestrator Node 102 may configure the QoS parameters through Hypertext Transfer Protocol 2 (HTTP2) interfaces of the PCF 114 and AF 116.

The Orchestrator Node 102 preferably configures the QoS parameters by setting up any one or more of: Guaranteed Flow Bit Rate (GFBR); Maximum Flow Bit Rate (MFBR); Session-Aggregate Maximum Bit Rate (AMBR); and 5G QoS Identifier (5QI).

The Orchestrator Node 102 configures the QoS parameters in the edge sites 106, 108 by setting QoS parameters on any routers/switches 134 and/or Customer Premises Equipments (CPEs) in or linked to said edge sites 106, 108 along the end-to-end path through the direct tunnel 136 to enforce end-to-end QoS between any UEs 132 and/or between any UE 132 and any MEC application 128 in at least one of the edge sites 106, 108.

Figure 6:
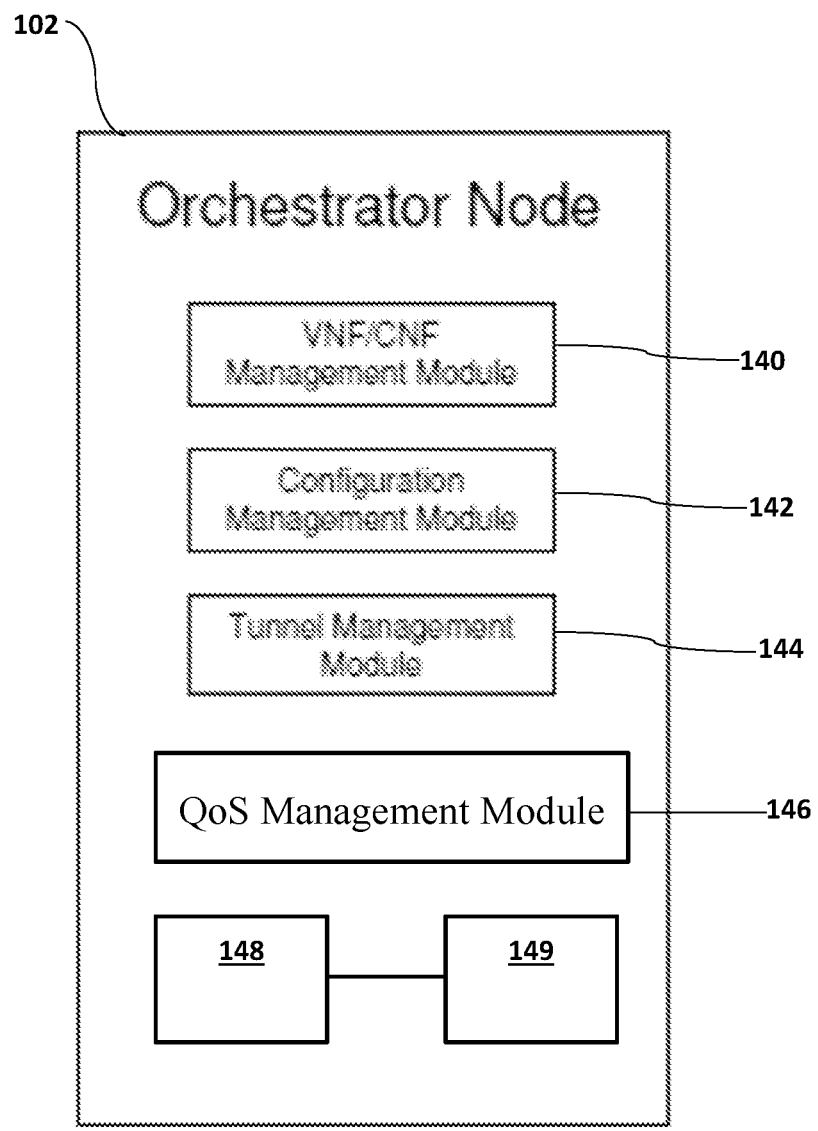
FIG. 6 a block schematic diagram of an Orchestrator Node for the 5G communications network on the hybrid cloud of FIG. 2 in accordance with the invention.

FIG. 6 shows an exemplary embodiment of an Orchestrator Node 102 in accordance with concepts of the present invention. In the illustrated embodiment, the Orchestrator Node 102 may comprise communication equipment such as a network node, a network card, or a network circuit, etc. operating in the 5G core network 104.

The Orchestrator Node 102 comprises four modules. The four modules comprise a Virtual Network Function/Cloud-Native Network Function (VNF/CNF) management module 140, a Configuration Management Module 142, a Tunnel Management Module 144, and a QoS Management Module 146. Each of the four modules 140, 142, 144, 146 may comprise functional blocks for performing their respective functions. The functional block modules comprise various data sink, control element(s), user interface(s), etc. Each functional module may be implemented using logic circuits and/or executable code/machine readable instructions stored in a memory of the Orchestrator Node 102 for execution by a processor 148 to thereby perform functions as described herein. For example, the executable code/machine readable instructions may be stored in one or more memories 149 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 149 may comprise processor-readable memories for use with respect to one or more processors 148 operable to execute code segments of the functional modules and/or utilize data provided thereby to perform functions of the functional modules described herein. Additionally, or alternatively, the functional modules may each comprise one or more special purpose processors (e.g., application specific integrated circuit (ASIC), field programmable gate array (FPGA), graphics processing unit (GPU), and/or the like configured to perform their respective functions as described herein.

Figure 7:
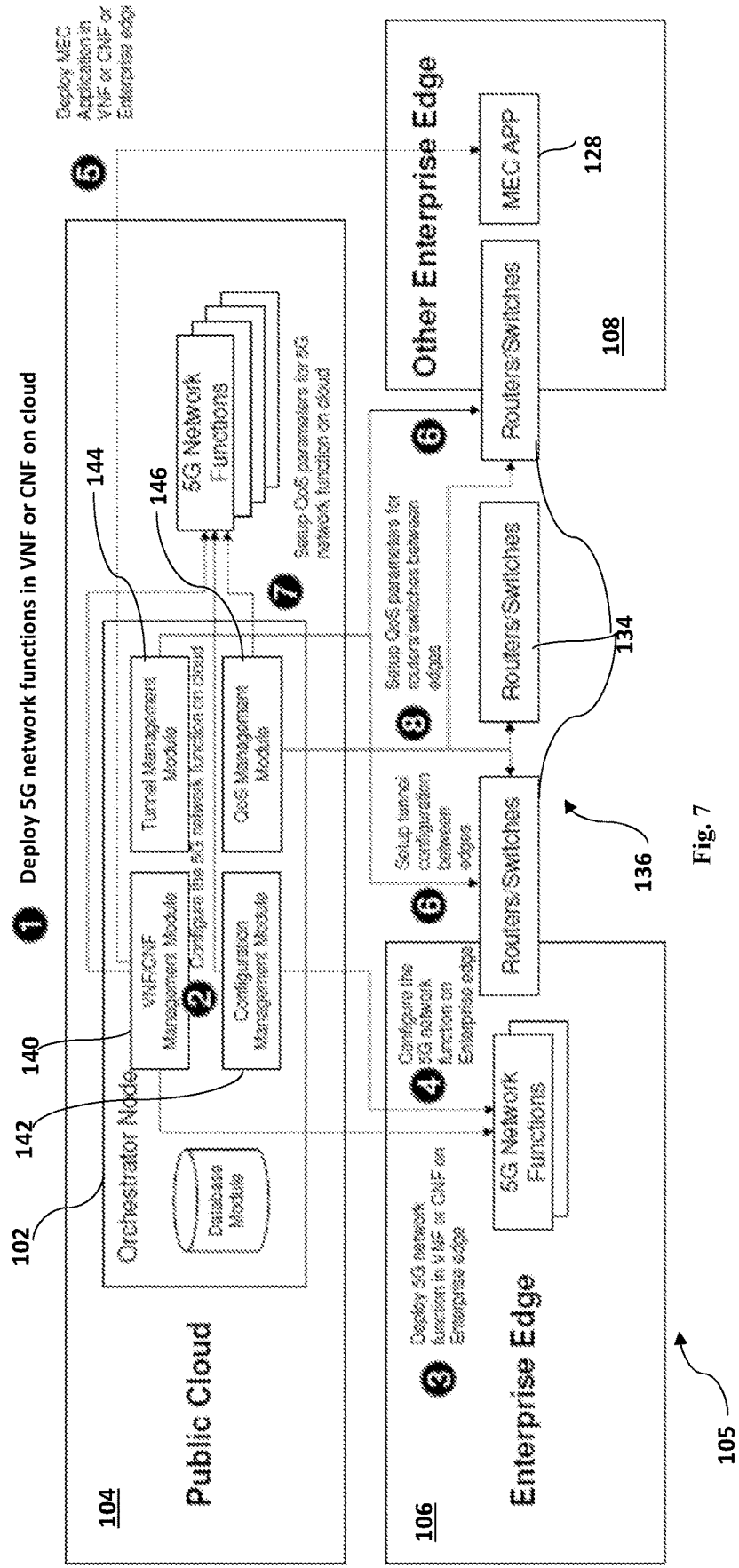
FIG. 7 a more detailed block schematic diagram of the Orchestrator Node of FIG. 6 and its connection to the enterprise network edge sites and also showing steps of a method in accordance with the invention.
Figure 8:
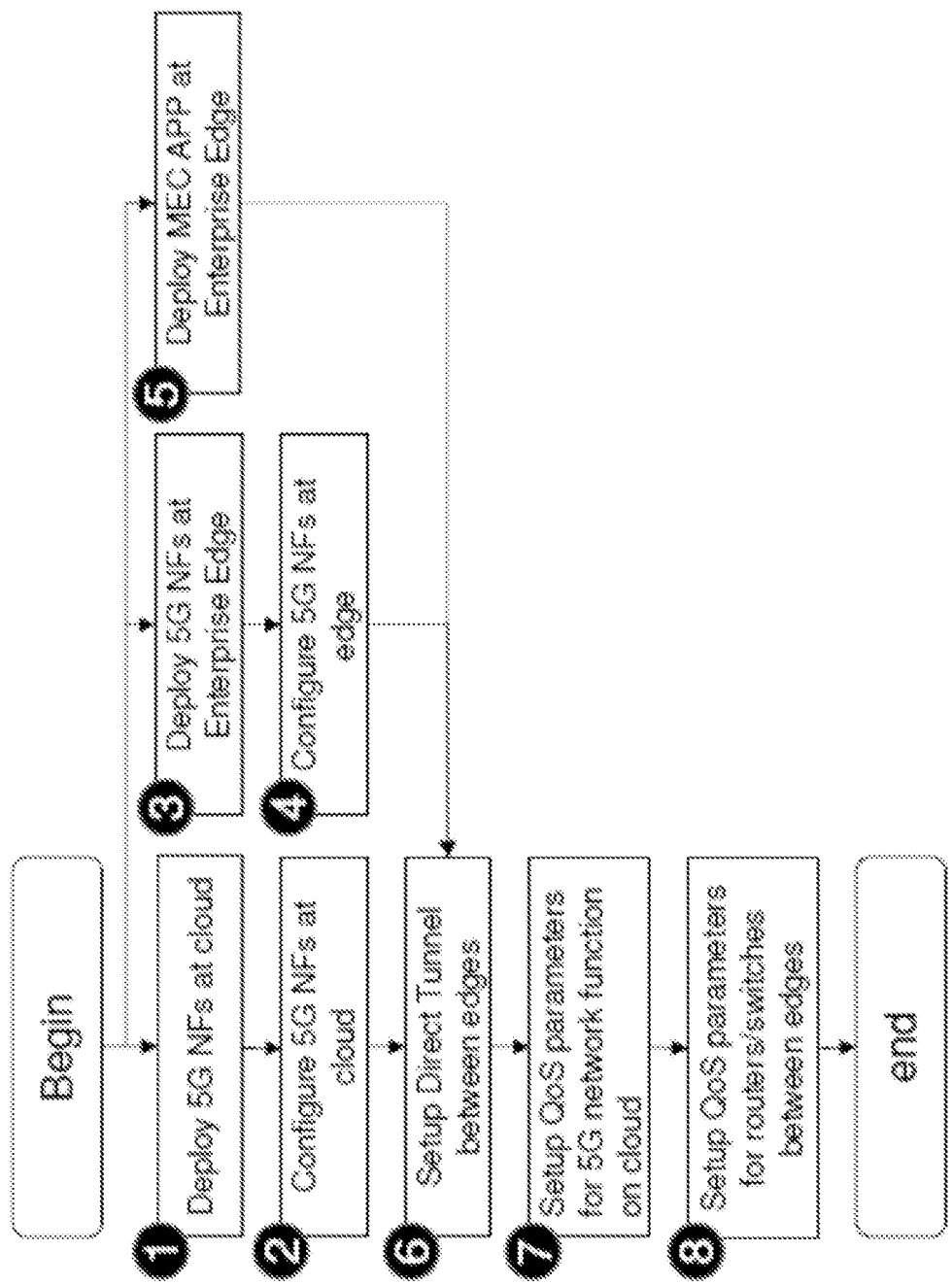
FIG. 8 comprises a flow chart of the steps of the method shown in FIG. 7.

Referring to FIGS. 7 and 8, FIG. 7 provides a more detailed block schematic diagram of the Orchestrator Node 102 of FIG. 6 and its connection to the enterprise network edge sites 106, 108 and also showing steps of a method in accordance with the invention. FIG. 8 comprises a flow chart of the steps of the method shown in FIG. 7.

As seen in FIG. 7, the VNF/CNF Management Module 140 of the Orchestrator Node 102 implements steps 1, 3 and 5, the Configuration Management Module 142 implements steps 2 and 4, the Tunnel Management Module 144 implements step 6 and the QoS Management Module 146 implements steps 7 and 8. The VNF/CNF Management Module 140 may implement steps 1, 3 and 5 simultaneously. The Configuration Management Module 142 may implement steps 2 and 4 simultaneously.

The method comprises steps 1 to 8 as shown in both FIGS. 7 and 8. The method comprises step 1 of the VNF/CNF Management Module 140 deploying 5G NFs at the 5G core network 104. Simultaneously with step 1, the VNF/CNF Management Module 140 may deploy in step 3 5G NFs at the edge sites 106, 108 of the enterprise network 105 and may deploy in step 5, if required as shown in this example, one or more MEC applications 128 at the enterprise edge sites 106, 108.

After at least step 1, the Configuration Management Module 142 in step 2 configures the deployed 5G NFs in the 5G core network 104 and, if required, may configure in step 4 the deployed 5G NFs at the edge sites 106, 108 of the enterprise network 105 simultaneously with configuring the deployed 5G NFs in the 5G core network 104.

Once all 5G NFs have been deployed and configured as required, the Tunnel Management Module 144 in step 6 sets up the direct tunnel 136 between the edge sites 106, 108 of the enterprise network 105.

Steps 1 to 6 of the method may be considered as comprising one preferred embodiment of the method of setting up a direct tunnel 136 in accordance with the invention.

Following step 6, the QoS Management Module 146 sets up in step 7 the QoS parameters in the 5G core network 104 and then, in step 8, sets up the QoS parameters for the plurality of routers/switches 134 comprising the direct tunnel 136.

Steps 1 to 8 of the method may be considered as comprising one preferred embodiment of the method of setting up an end-to-end QoS path through the direct tunnel 136 between the edge sites 106, 108 in accordance with the invention.

Figure 9:
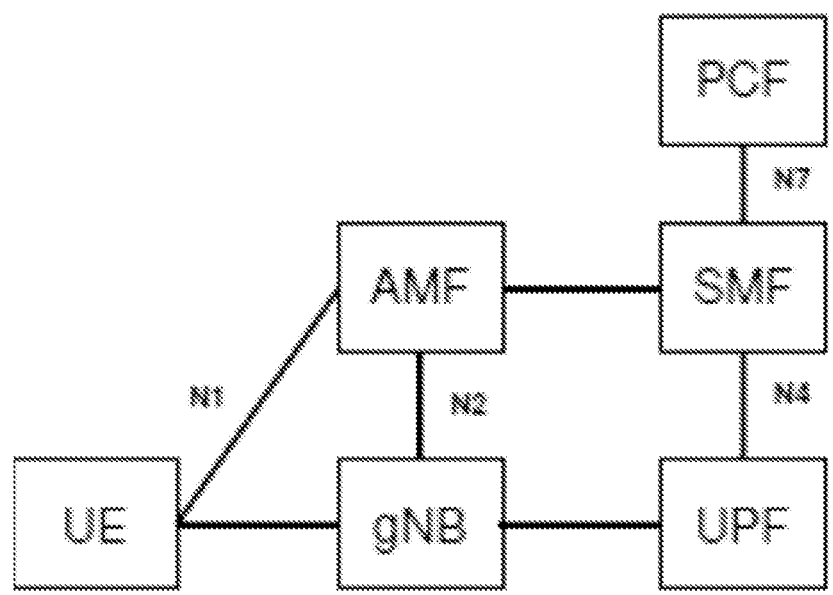
FIG. 9 illustrates QoS control in the 5G communications network Control Plane.

FIG. 9 illustrates QoS control in the 5G communications network Control Plane (CP). The SMF manages the PDU session of a UE and assigns a QFI and QoS profile to the flow based on information provided by the PCF. The SMF then provides UPF with the PDR for mapping the SDF to the QoS flow. The SMF sends the QoS profile to the gNB via the AMF. The gNB can map the 5G QoS Flow to a specific Data Radio Bearer (DRB) on the radio interface. The AMF conveys the QoS rule to the UE to aid in mapping SDF flows to a 5G QoS flow and the correct DRB. The AMF sends the QoS Rule (Packet Filter, QFI) and session AMBR to the UE on the N1 interface. The AMF sends the QoS profile (QFI, 5QI, ARP, MFBR, GFBR, AMBR, Notification Control, Maximum Packet Loss Rate) to gNB on the N2 interface. The SMF sends the SDF Template (QFI, RQA, QER) to the UPF on the N4 interface. The SMF gets the SDF Filter in PCC Rule from the PCF on the N7 interface.

Figure 10:
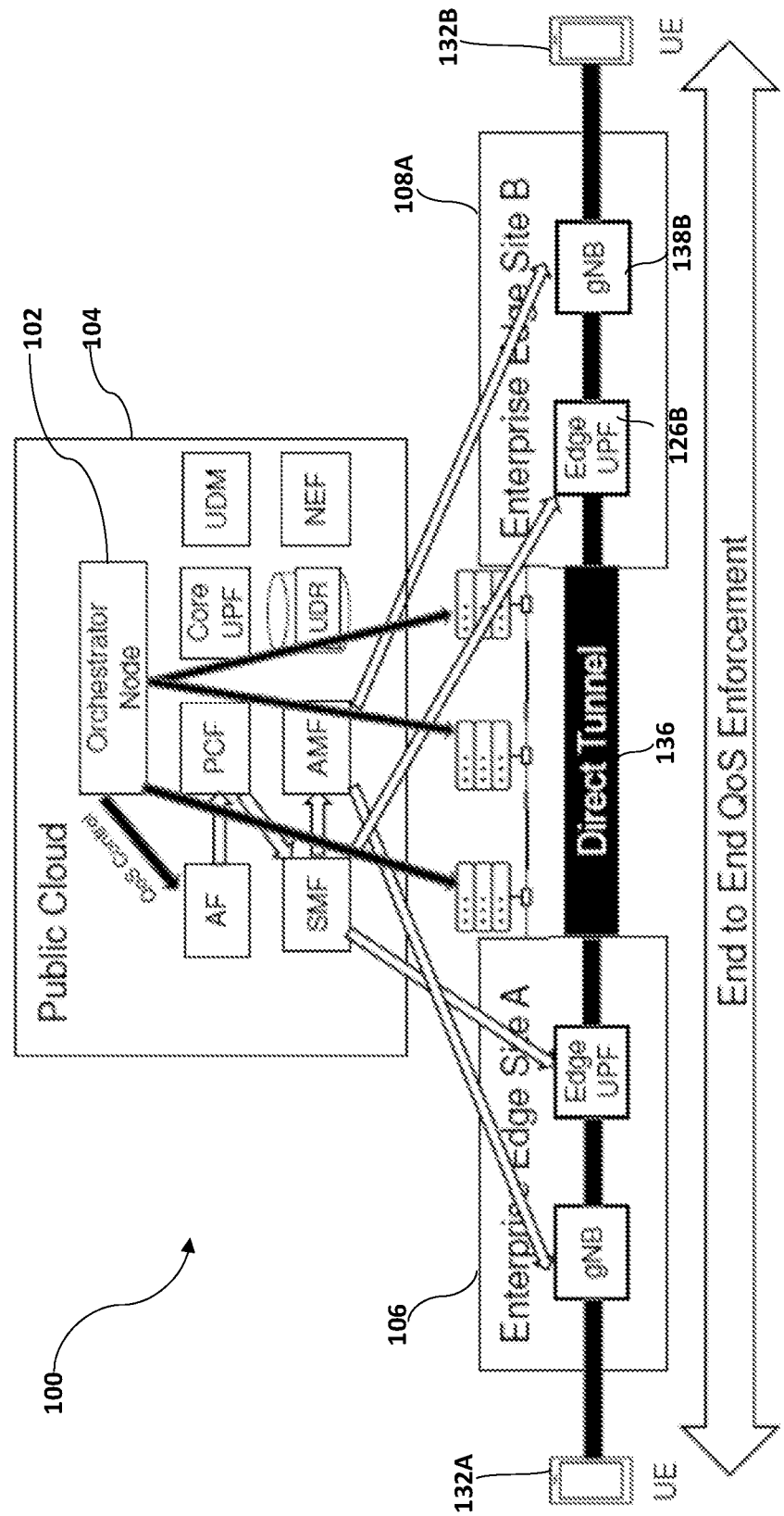
FIG. 10 a block schematic diagram of another arrangement of the 5G communications network on the hybrid cloud when setting up QoS policy on an end-to-end data traffic path on the direct tunnel between UEs at edge sites in accordance with the method of the invention.

FIG. 10 provides a block schematic diagram of another arrangement of the 5G communications network 100 on the hybrid cloud when setting up QoS policy on an end-to-end data traffic path on the direct tunnel 136 between UEs 132A, B at Edge Site A 106 and Edge Site B 108A. In addition to the direct and indirect QoS signals transmitted in the network arrangement of FIG. 5, it is necessary in the network arrangement of FIG. 10 for the Orchestrator Node 102 to also issue QoS control signals indirectly to the network entities, e.g., gNB 138B and edge UPF126B, of Edge Site B 108A.

Figure 11:
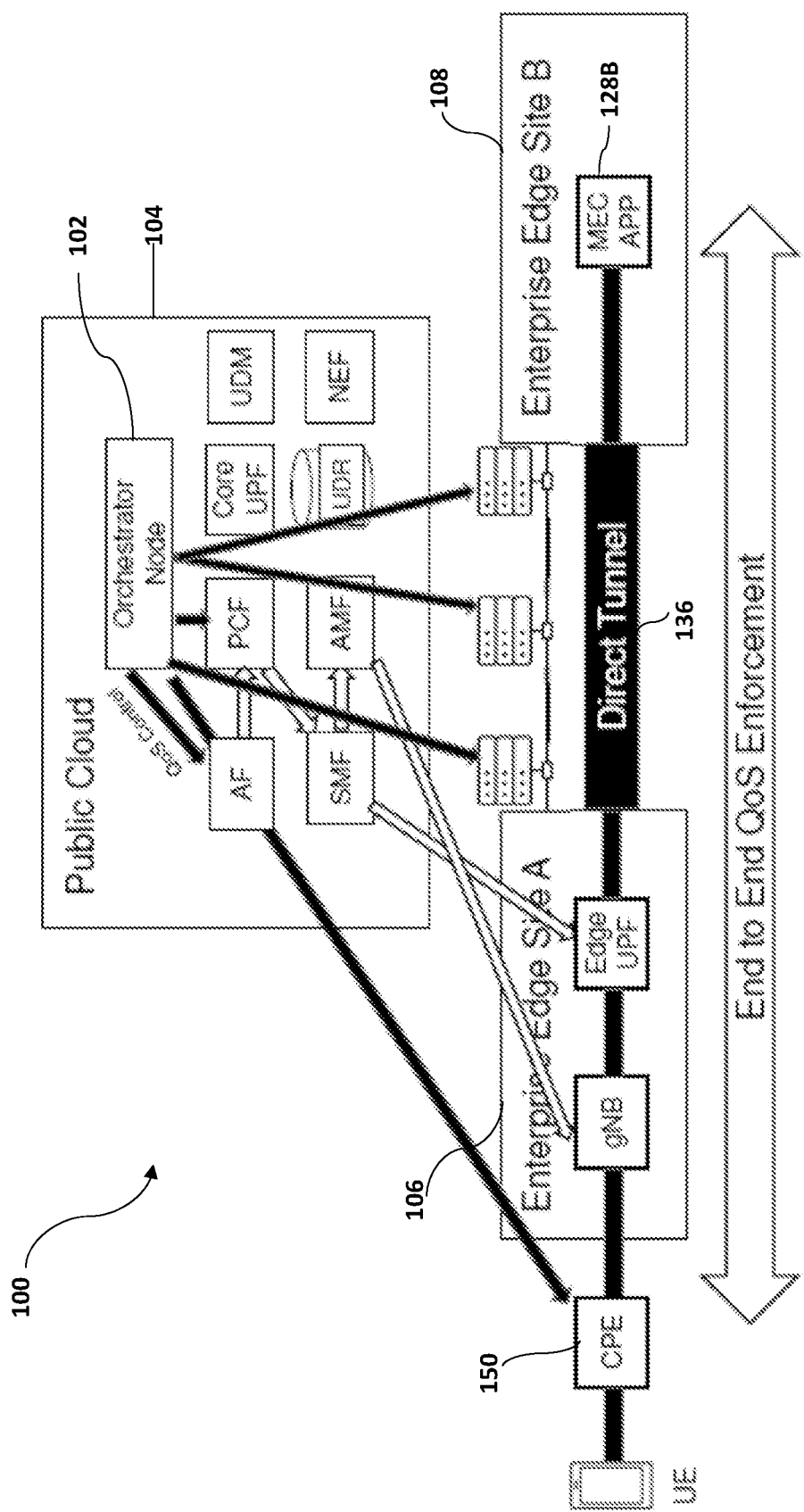
FIG. 11 a block schematic diagram of another arrangement of the 5G communications network on the hybrid cloud when setting up QoS policy on an end-to-end data traffic path on the direct tunnel between a Customer Premises Equipment (CPE) at an edge site and an application at another edge site in accordance with the method of the invention.

FIG. 11 provides a block schematic diagram of yet another arrangement of the 5G communications network 100 on the hybrid cloud when setting up QoS policy on an end-to-end data traffic path on the direct tunnel 136 between a Customer Premises Equipment (CPE) 150 at Edge Site A 106 and an MEC application 128B at Edge Site B 108. In addition to the direct and indirect QoS signals transmitted in the network arrangement of FIG. 5, it is necessary in the network arrangement of FIG. 11 for the Orchestrator Node 102 to also issue a QoS control signal directly to the CPE 150 at Edge Site A 106.

Figure 12:
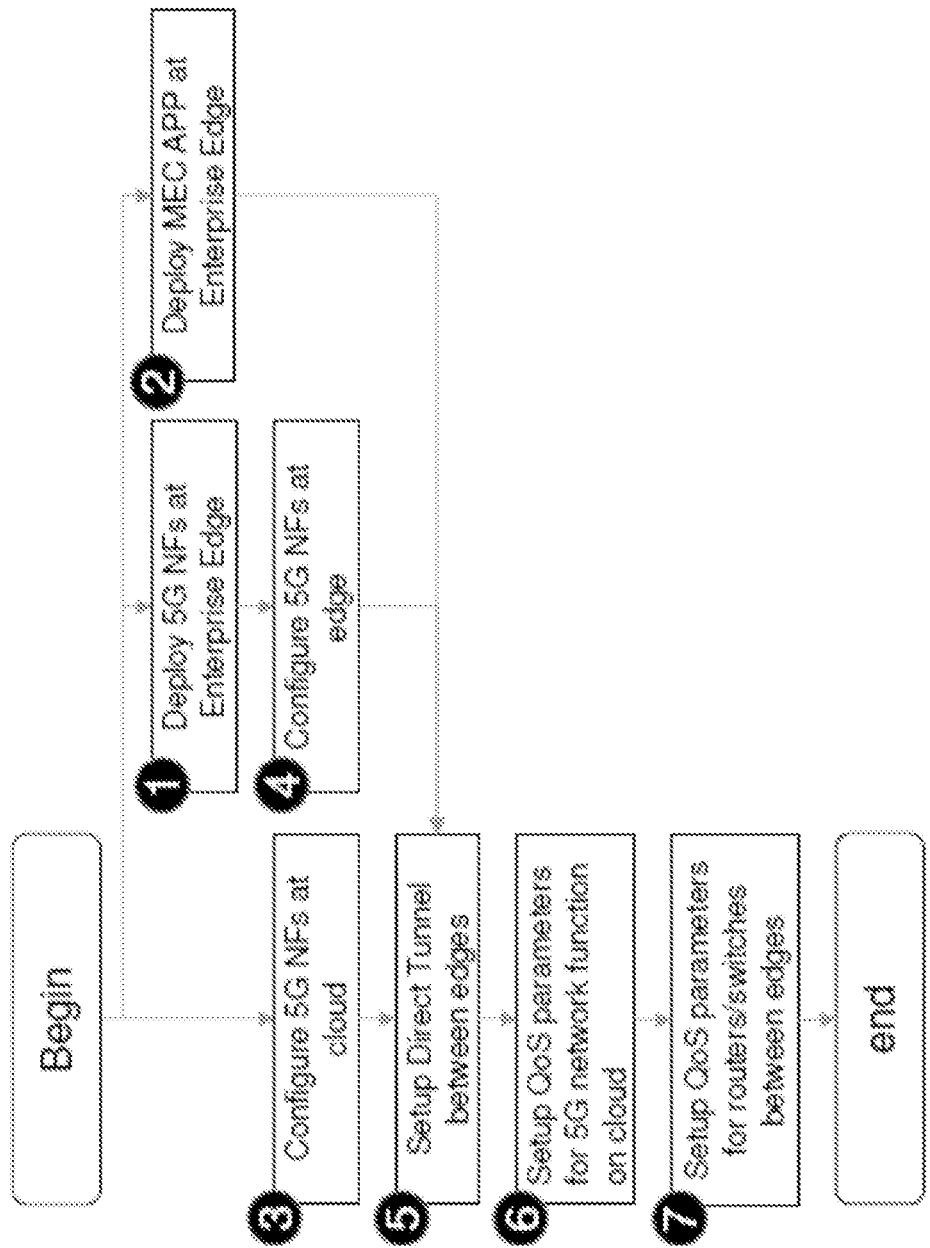
FIG. 12 comprises a flow chart of the steps of an alternative method to that shown in FIG. 8 where the 5G NFs are already deployed in the 5G core network/public cloud.

FIG. 12 comprises a flow chart of the steps of an alternative method to that shown in FIG. 8 where the 5G NFs are already deployed in the 5G core network/public cloud 104. In this embodiment of the method, it is not necessary for the VNF/CNF Management Module 140 to deploy 5G NFs at the at the 5G core network 104 as these are already deployed.

The method comprises steps 1 to 7 as shown in FIG. 12. The method comprises step 1 of the VNF/CNF Management Module 140 deploying 5G NFs at the edge sites 106, 108 of the enterprise network 105 and also deploying in step 2, if required, one or more MEC applications 128 at the enterprise edge sites 106, 108. Steps 1 and 2 may be implemented simultaneously.

After at least step 1, the Configuration Management Module 142 in step 3 configures the deployed 5G NFs in the 5G core network 104 and, if required, may configure in step 4 the deployed 5G NFs at the edge sites 106, 108 of the enterprise network 105 simultaneously with configuring the deployed 5G NFs in the 5G core network 104.

Once all 5G NFs have been deployed and configured as required, the Tunnel Management Module 144 in step 5 sets up the direct tunnel 136 between the edge sites 106, 108 of the enterprise network 105.

Steps 1 to 5 of this method may be considered as comprising another preferred embodiment of the method of setting up a direct tunnel in accordance with the invention.

Following step 5, the QoS Management Module 146 sets up in step 6 the QoS parameters in the 5G core network 104 and then, in step 7, sets up the QoS parameters for the plurality of routers/switches 134 comprising the direct tunnel 136.

Steps 1 to 7 of this method may be considered as comprising another preferred embodiment of the method of setting up an end-to-end QoS path through the direct tunnel 136 between the edge sites 106, 108 in accordance with the invention.

Figure 13:
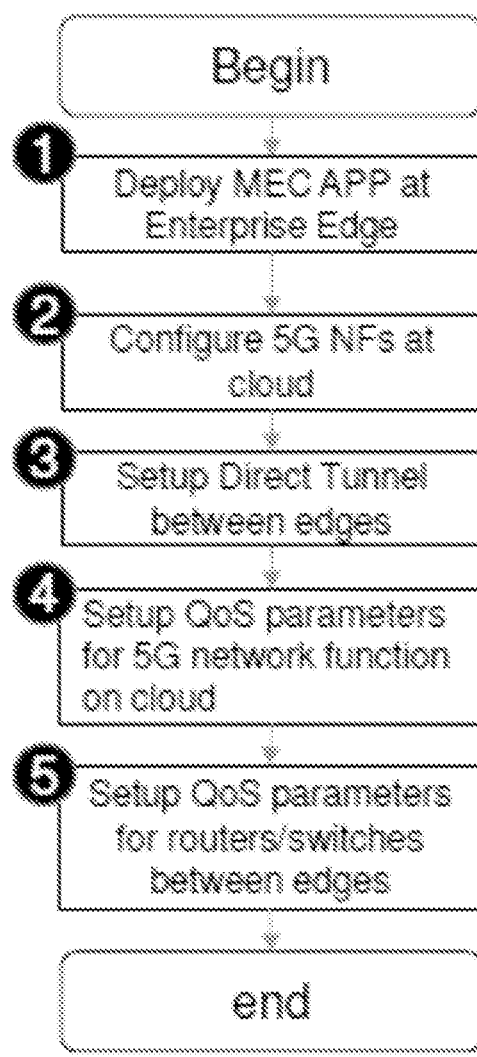
FIG. 13 comprises a flow chart of the steps of an alternative method to that shown in FIG. 8 or FIG. 12 where the 5G NFs are already deployed in the 5G core network/public cloud and the 5G NFs are already deployed in the edge sites/private cloud.

FIG. 13 comprises a flow chart of the steps of an alternative method to that shown in FIG. 8 or FIG. 12 where the 5G NFs are already deployed in the 5G core network/public cloud 104 and the 5G NFs are already deployed in the enterprise network/private cloud 105. This method does not require the VNF/CNF Management Module 140 to deploy 5G NFs at the 5G core network 104 or to deploy 5G NFs at the enterprise edge sites 106, 108. It also does not require the VNF/CNF Management Module 140 to configure 5G NFs at the edge sites 106, 108.

The method comprises steps 1 to 5 as shown in FIG. 13. The method comprises step 1 of the VNF/CNF Management Module 140 deploying an MEC application 128 at one or more of the edge sites 106, 108 of the enterprise network 105. After step 1, the Configuration Management Module 142 in step 2 configures the deployed 5G NFs in the 5G core network 104.

Once all 5G NFs have been deployed and configured as required, the Tunnel Management Module 144 in step 3 sets up the direct tunnel 136 between the edge sites 106, 108 of the enterprise network 105.

Steps 1 to 3 of this method may be considered as comprising yet another preferred embodiment of the method of setting up a direct tunnel 136 in accordance with the invention.

Following step 3, the QoS Management Module 146 sets up in step 4 the QoS parameters in the 5G core network 104 and then, in step 5, sets up the QoS parameters for the plurality of routers/switches 134 comprising the direct tunnel 136.

Steps 1 to 5 of this method may be considered as comprising yet another preferred embodiment of the method of setting up an end-to-end QoS path through the direct tunnel 136 between the edge sites 106, 108 in accordance with the invention.

Figure 14:
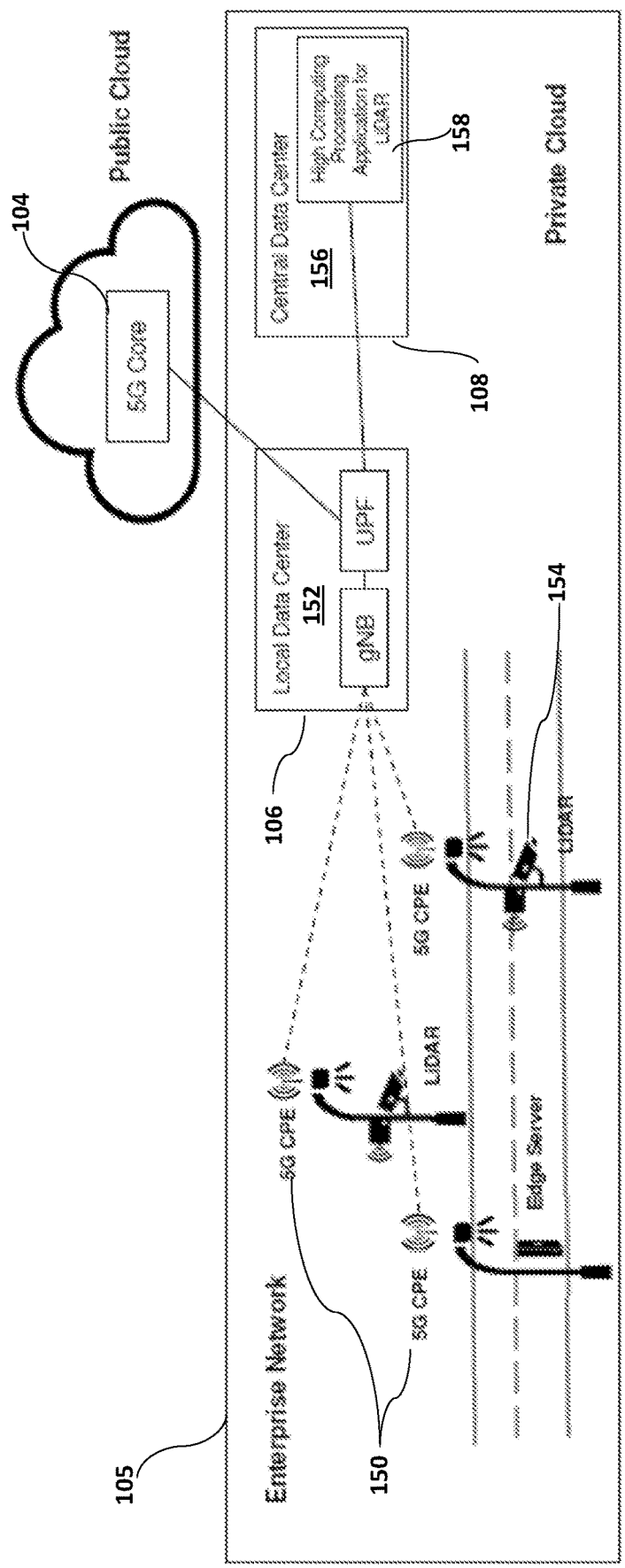
FIG. 14 is a block schematic diagram illustrating implementation of the invention in an exemplary embodiment of an enterprise network.

FIG. 14 provides a block schematic diagram illustrating an implementation of the invention in an exemplary embodiment of an enterprise network 105. The enterprise network 105 comprises a first edge site 106 comprising a local data center 152 serving a plurality of 5G CPEs 150. In this example, the CPEs 150 comprise LiDAR devices 154 as used road management systems. The enterprise network 105 includes a second edge site 108 with a central data center 156 including a high computing processing application 158 for LiDAR data. The method of the invention can be utilized to establish a direct tunnel between the first and second edge sites 106, 108 to enable the high computing processing application 158 for LiDAR data in the second site 108 to support processing of LiDAR data received at the first edge site 106. The direct tunnel can be established with QoS in accordance with the method of the invention to ensure data with high priority is transmitted with reliability and low latency between the first and second edge sites 106, 108.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of setting up a direct connection between edge sites on a 5G communications network, the method comprising the steps of:
   configuring 5G network functions (NFs) in the 5G communications network;
   configuring 5G NFs at the edge sites, if not already configured;
   based on said configured 5G NFs in the 5G communications network and at the edge sites, setting up a direct tunnel between the edge sites according to a predefined tunnel policy; and
   setting up a QoS connection on the direct tunnel between the edge sites by:
      configuring QoS parameters on a Policy Control Function (PCF) and an Application Function (AF); and
      configuring QoS parameters in 5G network entities along an end-to-end path through the direct tunnel between the edge sites.

2. The method of claim 1, wherein configuring the 5G NFs in the 5G communications network and at the edge sites is performed by a 5G communications network Orchestrator node and 5G network configurations for the direct tunnel are defined in the Orchestrator node by an edge site end-user.

3. The method of claim 2, wherein the Orchestrator node stores the 5G network configurations and any edge site network configurations and uses the stored 5G network configurations and any edge site network configurations to determine or calculate individual configurations for each 5G NF in the 5G communications network and at the edge sites.

4. The method of claim 3, wherein, after the Orchestrator node has pushed the determined or calculated 5G NF configurations to deployed NFs on the 5G communications network and to deployed NFs at the edge sites, user equipments (UEs) at the edge sites set up respective Protocol Data Unit (PDU) sessions and send data traffic over paths on the direct tunnel.

5. The method of claim 4, wherein a Session Management Function (SMF) manages each PDU session and assigns a QoS Flow ID (QFI) and QoS profile to a data flow of each PDU session based on information provided by a Policy Control Function (PCF).

6. The method of claim 5, wherein the SMF provides a User Plane Function (UPF) with a Packet Detection Rule (PDR) for mapping Service Data Flow (SDF) to the QoS flow of the PDU session.

7. The method of claim 2, wherein the Orchestrator node deploys a Multi-access Edge Computing (MEC) application in at least one of the edge sites.

8. The method of claim 2, wherein the Orchestrator node sets up the direct tunnel between the edge sites as an Internet Protocol Security (IPSec) tunnel.

9. The method of claim 2, wherein the Orchestrator node deploys 5G NFs comprising Access and Mobility Management Function (AMF), Session Management Function (SMF), Core User Plane Function (UPF), Policy Control Function (PCF), Application Function (AF), Unified Data Repository (UDR), Network Exposure Function (NEF) and Unified Data Management (UDM) on a public cloud comprising the 5G communications network and deploys 5G edge UPF on the edge sites in any of: a container; a Virtual Machine (VM); or a BareMetal server.

10. The method of claim 1, wherein the Orchestrator node pushes QoS signalling to the 5G network entities along the end-to-end path by direct signalling and pushes QoS signalling to edge site entities using indirect signalling.

11. The method of claim 1, wherein the Orchestrator node configures the QOS parameters through Hypertext Transfer Protocol 2 (HTTP2) interfaces of the PCF and AF.

12. The method of claim 11 wherein the Orchestrator node configures the QoS parameters by setting up any one or more of: Guaranteed Flow Bit Rate (GFBR); Maximum Flow Bit Rate (MFBR); Session-Aggregate Maximum Bit Rate (AMBR); and 5G QoS Identifier (5QI).

13. The method of claim 1, wherein the Orchestrator node configures QoS parameters in the edge sites by setting QOS parameters on any routers, switches and/or Customer Premises Equipments (CPEs) in said edge sites along the end-to-end path through the direct tunnel to enforce end-to-end QoS between any UEs and/or between any UE and any Multi-access Edge Computing (MEC) application in at least one of the edge sites.

14. The method of claim 1, wherein the edge sites are enterprise edge sites on an enterprise network connected by a public cloud network comprising the 5G communications network.

15. An Orchestrator node for a 5G communications network connecting edge sites, the Orchestrator node comprising:
 a Virtual Network Function/Cloud-Native Network Function (VNF/CNF) Management Module which, on receiving a request, deploys 5G network functions (NFs) in the 5G communications network and at the edge sites, said Virtual Network Function/Cloud-Native Network Function (VNF/CNF) Management Module deploying said 5G network functions (NFs) in any of: containers; Virtual Machines (VMs); or BareMetal servers, managing a lifecycle of any of: the containers; the Virtual Machines (VMs); or the BareMetal servers for 5G NFs, and scaling in/out any of: the containers; the Virtual Machines (VMs); or the BareMetal servers in response to decreasing/increasing capacity of the 5G network functions (NFs);
 a Configuration Management Module which configures any of the 5G network functions (NFs) deployed in the 5G communications network and which configures any of the 5G network functions (NFs) deployed at the edge sites, if not already configured; and
 a Tunnel Management Module which sets up a direct tunnel between the edge sites according to a predefined tunnel policy based on said configured 5G network functions (NFs) in the 5G communications network and at the edge sites.

16. The Orchestrator node of claim 15 including a database module storing any of: any 5G network configurations; any edge site network configurations; QoS policies; and other related information.

17. The Orchestrator node of claim 16, wherein the Configuration Management Module pushes determined or calculated individual 5G NF configurations to deployed NFs on the 5G communications network and to deployed NFs at the edge sites, where the determined or calculated individual 5G NF configurations are determined or calculated based on any 5G network configurations and any edge site network configurations stored in the database module.

18. A method of setting up a direct connection between edge sites on a 5G communications network, the method comprising the steps of:
 a 5G communications network Orchestrator node configuring 5G network functions (NFs) in the 5G communications network;
 the 5G communications network Orchestrator node also configuring 5G NFs at the edge sites, if not already configured, wherein 5G network configurations for the direct tunnel are defined in the Orchestrator node by an edge site end-user;
 based on said configured 5G NFs in the 5G communications network and at the edge sites, setting up a direct tunnel between the edge sites according to a predefined tunnel policy; and
 the Orchestrator node storing the 5G network configurations and any edge site network configurations and using the stored 5G network configurations and any edge site network configurations to determine or calculate individual configurations for each 5G NF in the 5G communications network and at the edge sites;
 wherein, after the Orchestrator node has pushed the determined or calculated 5G NF configurations to deployed NFs on the 5G communications network and to deployed NFs at the edge sites, user equipments (UEs) at the edge sites set up respective Protocol Data Unit (PDU) sessions and send data traffic over paths on the direct tunnel.

* * * * *